United States Patent [19]

Bahel et al.

[11] 4,070,870

[45] Jan. 31, 1978

[54] HEAT PUMP ASSISTED SOLAR POWERED ABSORPTION SYSTEM

[75] Inventors: Vijay Omprakash Bahel, Schaumburg; Richard Kuehner, Mount Prospect, both of Ill.

[73] Assignee: Borg-Warner Corporation, Chicago, Ill.

[21] Appl. No.: 729,502

[22] Filed: Oct. 4, 1976

[51] Int. Cl.² .................. F25B 27/00; F25B 27/02; F25B 13/00
[52] U.S. Cl. .................................... 62/2; 62/238; 62/324; 237/2 B
[58] Field of Search .................. 62/2, 238, 335, 510, 62/501, 513, 324; 237/2 B

[56] References Cited

U.S. PATENT DOCUMENTS

| | | | |
|---|---|---|---|
| 2,030,350 | 2/1936 | Bremser | 62/2 |
| 2,693,939 | 11/1954 | Marchant et al. | 62/2 |
| 3,401,530 | 9/1968 | Meckler | 62/2 |
| 3,824,804 | 7/1974 | Sandmark | 62/238 |
| 4,011,731 | 3/1977 | Meckler | 62/2 |
| 4,012,920 | 3/1977 | Kirschbaum | 62/2 |

*Primary Examiner*—Lloyd L. King
*Attorney, Agent, or Firm*—Thomas B. Hunter

[57] ABSTRACT

An all-year heating and cooling system incorporates an absorption refrigeration machine using solar energy as a primary heat source and a compression cycle system for boosting the temperature of the heating medium supplied to the absorption machine generator. During the heating mode, the solar collector, may be replaced by the compression cycle system if insufficient solar energy is available to satisfy the demand for heating.

3 Claims, 3 Drawing Figures

COOLING CYCLE

HEATING CYCLE-NO SOLAR HEAT

HEATING CYCLE—SOLAR HEAT ONLY

HEAT PUMP ASSISTED SOLAR POWERED ABSORPTION SYSTEM

BACKGROUND OF THE INVENTION

1. Field of the Invention

All-year air conditioning systems employing solar energy as at least one of the heat sources for operating the heating and cooling units.

2. Description of the Prior Art

Bremser (U.S. Pat. No. 2,030,350) shows a solar operated absorption system of the ammonia type but it is not provided with any form of heat input augmentation.

Haywood (U.S. Pat. No. 2,221,971) is directed to a solar energy powered absorption system similar to Bremser.

Marchant et al (U.S. Pat. No. 3,693,939) describes a heating and cooling system including a solar collector and a compression cycle refrigeration system.

Jackson et al (U.S. Pat. No. 2,713,252) shows a heat pump system with a "solar heat trap".

DETAILED DESCRIPTION OF THE INVENTION

Figure 1:
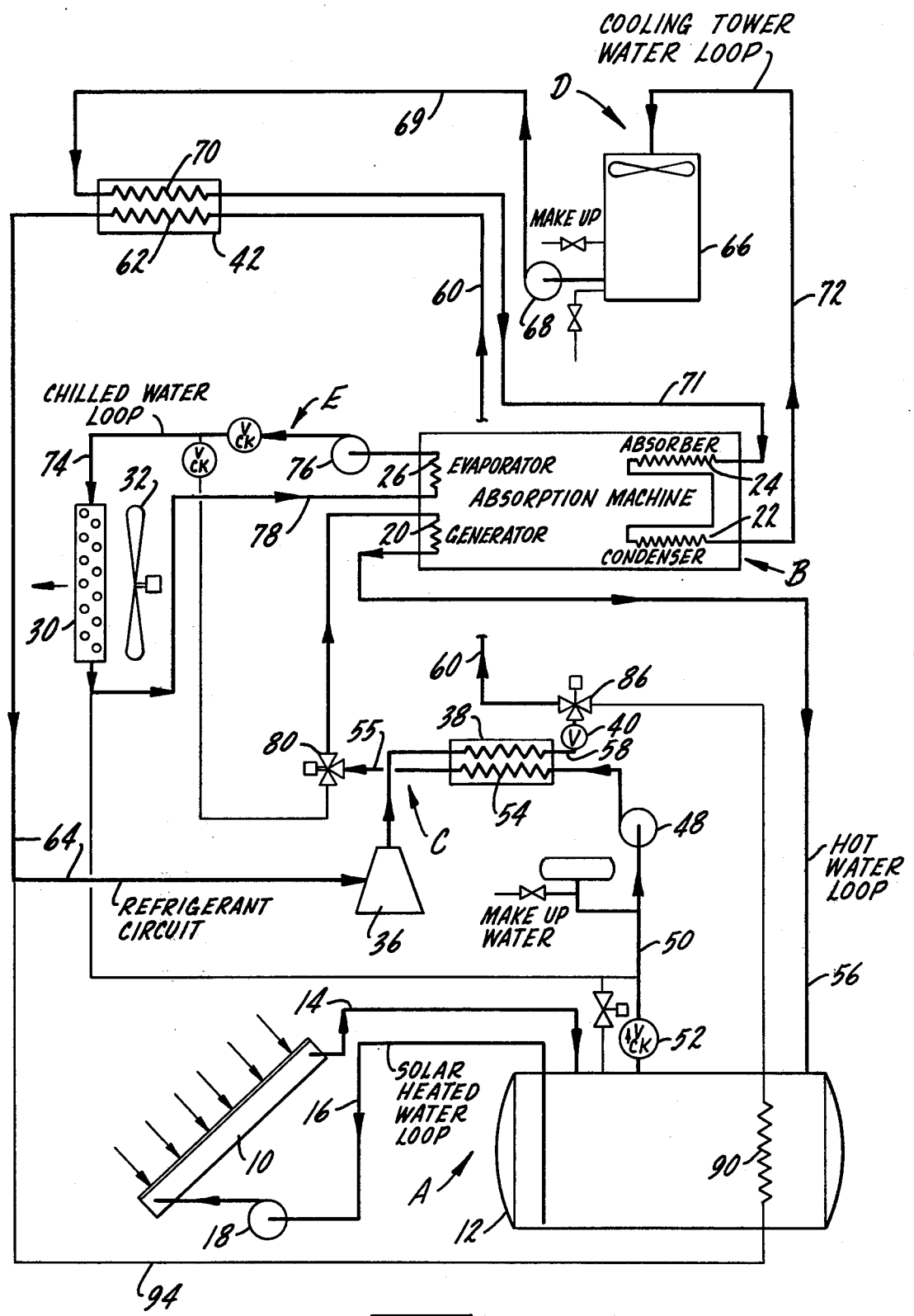
FIG. 1 is a schematic diagram showing the heating and cooling system of the present invention in the cooling cycle.

Referring to FIG. 1, the heating and cooling system of this invention includes several major subsystems which are interconnected to permit operation in both the cooling mode and the heating mode. FIG. 1 illustrates operation of the system in the cooling mode. The first major subsystem is the solar heating water loop A which includes the solar collector 10 and a storage tank 12 which are interconnected by suitable piping 14, 16 and a pump 18 for circulating water or other heat exchange medium, such as ethylene glycol or a brine, from the storage tank through the collector and back to the tank.

The second subsystem comprises an absorption refrigeration machine B which, in a preferred embodiment, is a lithium bromide system typically powered by any source of heat. In the present invention, the absorption machine uses water from the solar heated storage tank 12, the temperature of which is augmented by the compression cycle system C to be described below. Absorption machine includes a generator 20, a condenser 22, an absorber 24 and an evaporator 26 all connected in such a way that the lithium bromide solution introduced into the generator is caused to boil under the low pressure condition existing therein by the heat input supplied to a heat exchanger in the generator. The water vapor released in the generator is condensed in the condenser section 22 which is cooled by means of an external cooling water loop D. The condensed water vapor then flows to the evaporator section, which is maintained at a lower pressure than the generator/condenser, and the water is caused to boil by circulation of the primary heat transfer fluid circulating through a heat exchanger in the evaporator section 26. This circuit is referred to as the chilled water loop E and the chilled water is circulated through a plurality of terminal or air handling units, such as induction or fan coil units, within a building or it may be supplied to a single indoor heating and cooling coil over which air is circulated to various zones within the building. For convenience, the system is shown as including a single indoor air supply heat exchanger 30 with appropriate air circulating means 32.

The absorber section 24 operates to draw the water vapor released in the evaporator causing it to be absorbed in the "thirsty" lithium bromide solution. This, of course, causes dilution of the lithium bromide solution in the absorber and this dilute solution is transferred back to the generator where it is concentrated by evaporation of water vapor in a continuous manner.

The compression cycle subsystem C comprises a vapor compressor 36, a condenser 38, an expansion device 40 and an evaporator 42 all connected in closed circuit, series flow relationship and adapted to circulate a suitable halocarbon refrigerant as understood by those familiar with the refrigeration art.

During the cooling cycle, water is continuously circulated by pump 18 through the solar collector 10 to the storage tank 12 via lines 14 and 16. The heated water is drawn out of the storage tank by pump 48 through line 50 and check valve 52 to a coil 54 in condenser 38 where it is heated by the hot refrigerant gas from the compressor 36. The thermally augmented water is then circulated to the generator 20 in the absorption machine and then back to the storage tank 12 through line 56. In the compression cycle subsystem, the condensed vapor in the condenser 38 flows through the hot liquid line 58 to the expansion device and then via line 60 to evaporator 42 where it expands into a coil 62 to effect cooling of water circulating in the cooling tower water loop D. From there it passes through cold gas line 64 back to the suction side of the compressor to complete the cycle.

In the cooling tower loop D a conventional cooling tower 66 is adapted to circulate water in heat exchange relation with ambient air to effect cooling of the water. This water is then transferred by pump 68 and line 69 to the evaporator 42 and circulated through coil 70 where it is further cooled by heat exchange with expanding refrigerant in the refrigeration circuit flowing through coil 62. The cool water is then circulated through line 71 in series through the absorber 24 and the condenser 22 to maintain the desired temperature relationship in the respective absorber and condenser sections and then flows back to the cooling tower via line 72 to complete the circuit.

The chilled water supply loop E includes the evaporator section 26 of the absorption machine, a chilled water circulating pump 76, a line 74 connecting pump 76 with the indoor supply air heat exchanger 30 and a return line 78 which completes the circuit back to the absorption machine evaporator 26.

Figure 2:
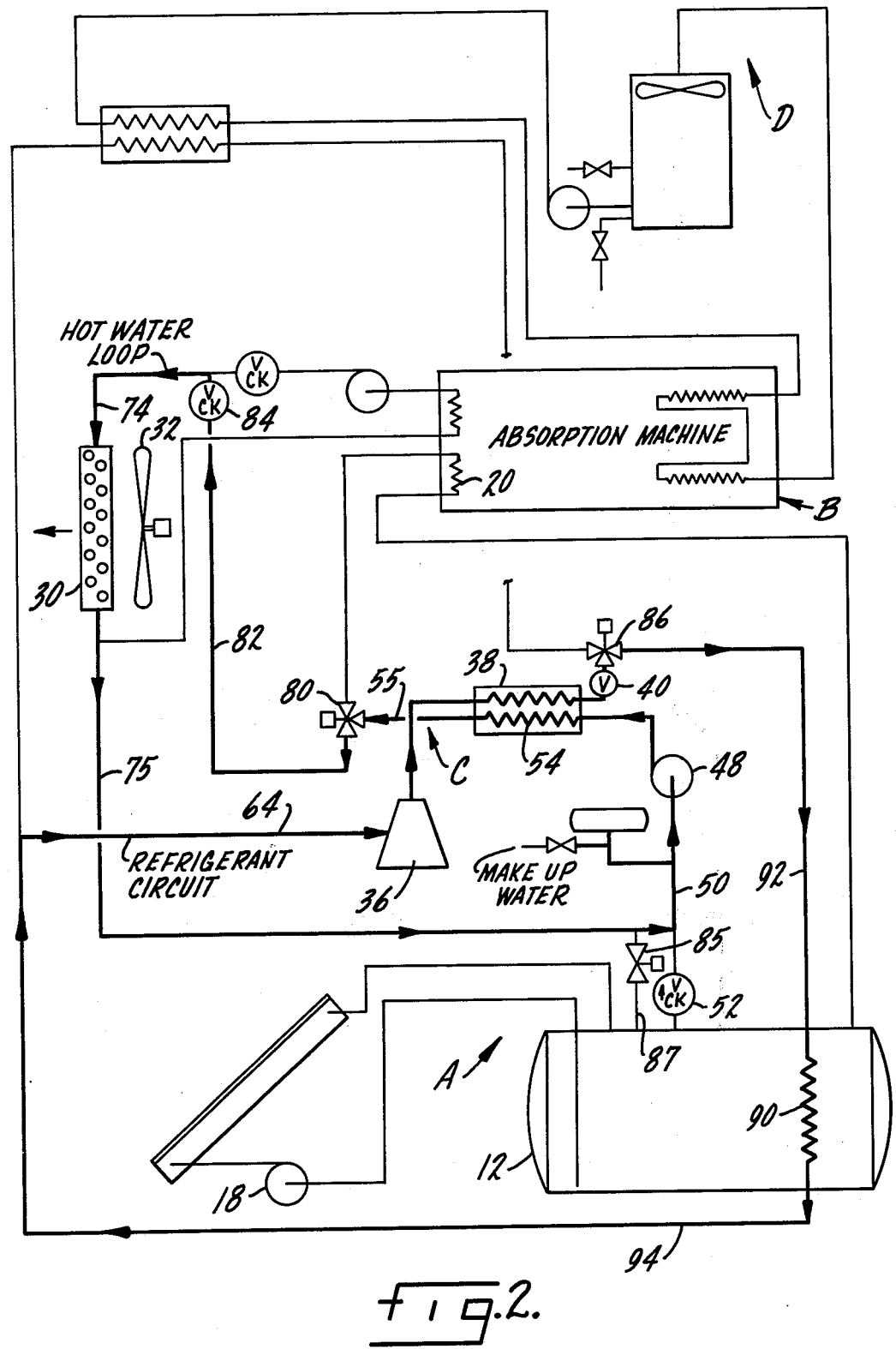
FIG. 2 is a schematic diagram showing the same system in the heating cycle with compression cycle heat input alone.

Having now described the basic system as it pertains to the cooling mode, attention is directed to FIG. 2 which illustrates the additional features allowing conversion to the heating mode. It will be noted that a three way diverting valve 80 is connected into the line 55 downstream from condenser heat exchange coil 54. From the alternate outlet of valve 80, line 82 connects with line 74 through a check valve 84. This bypasses the generator 20 and delivers water directly to the indoor air coil 30 and back to the inlet of the hot water recirculating pump through lines 75 and 50. Solenoid valve 85 is closed in line 87 to prevent return of water to the storage tank.

A second three way valve 86 is located downstream from condenser 38 in the compression cycle loop. The secondary outlet from valve 86 connects with an auxiliary evaporator coil 90 in the storage tank 12 by way of line 92 and is then connected to the compressor suction line 64 by conduit 94.

When solar heat is insufficient to handle the demand for heating, the compression cycle system is energized and the solar heat loop and absorption machine are both shut down. Details of operation under these conditions are described below.

Figure 3:
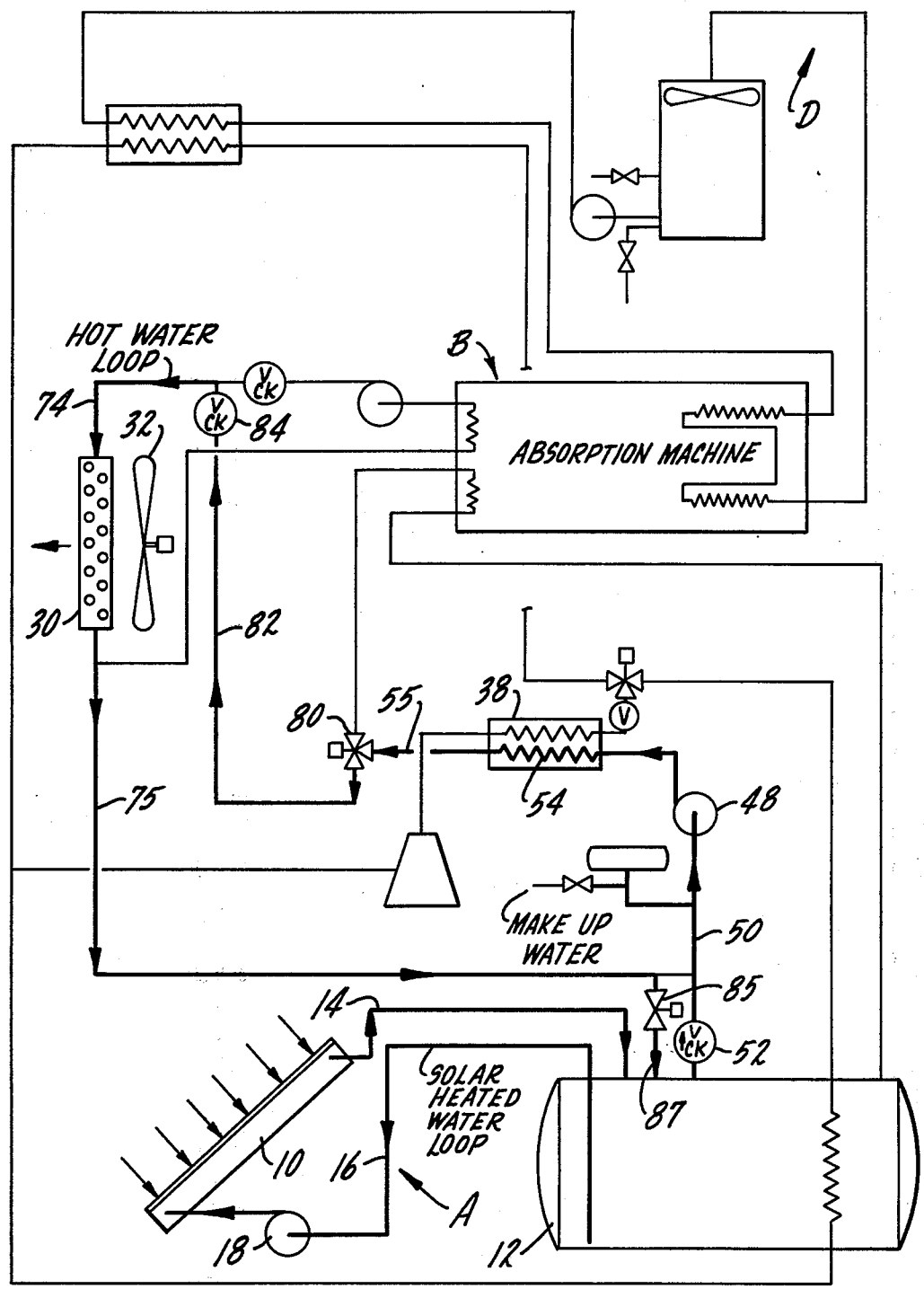
FIG. 3 is a schematic diagram illustrating the employment of the solar heat system instead of the compression cycle system.

When solar heat is available to satisfy heating demand, operation of both the compression cycle and absorption machine is discontinued and the solar heating pump 18 is energized to maintain hot water in the storage tank (see FIG. 3). This water is circulated directly to the indoor air coil 30 and back to the storage tank through line 87 and open solenoid valve 85.

OPERATION IN COOLING MODE

During operation of the system in the cooling mode, the solar heated water recirculator pump 18 continuously circulates water heated by collector 10 in the solar heated water loop. The hot water collected in the storage tank 12 is then circulated to condenser 38 where it picks up additional heat before reaching the generator 20 in the absorption machine. Since the efficiency of absorber systems is drastically curtailed by low generator temperatures, it is impractical to rely on solar heat alone to raise the temperature to the level (approximately 220°–240° F. ) required to operate the absorption machine in an efficient manner. However, by bringing the solar heated water in contact with the hot refrigerant gas from the compressor, the water temperature may be elevated to the desired level.

The absorption machine operates as the principal cooling source for the water in the chilled water loop. Under typical operating conditions, the returning chilled water is at a temperature of about 55° F. and the chilled water leaving the evaporator is about 45° F. Water is continuously circulated from the evaporator through the indoor heating/cooling coil 30 and back to the evaporator coil 26.

In the cooling tower water loop, water from the cooling tower is typically 80°–90° F., depending on the wet bulb temperature of the ambient air. This water is circulated to the evaporator where the temperature is reduced an additional 5°–10° F. which makes it ideal for operation of the absorption machine. Water is circulated in series through the absorber and condenser coils and then back to the cooling tower.

OPERATION IN THE HEATING MODE — SOLAR HEATING UNIT SHUTDOWN

Without sufficient solar energy to satisfy the demand for heating, the solar heating unit and the absorption machine are both shut down. The compression cycle subsystem thus provides all the heat similar to the operation of a heat pump on the heating cycle. A principle advantage in the present system is that warm water is available in storage tank 12 to evaporate refrigerant. Tank 12 thus functions as a stable heat sink from which heat can be abstracted.

Compressor 36 delivers hot gas to condenser 38 where it comes into heat exchange relation with the hot water circulating through coil 54. The refrigerant is condensed and flows through expansion device 40, three way valve 86 and line 92 to evaporator 90. From there, the suction gas flows through lines 94 and 64 to the inlet side of compressor 36.

At the same time, the hot water flows from coil 54 through three way valve 80, line 82, check valve 84 and lines 74 to the indoor air coil 30. The returning water flows through lines 75 and 50 back to the inlet side of pump 48.

OPERATION IN THE HEATING MODE — SOLAR HEAT AVAILABLE

When solar heat is available to satisfy the load, operation of the compression cycle system is discontinued and the solar heated water pump is energized. Hot water is maintained in the storage tank 21 and made available to the system for circulation through the heated water circuit.

Solenoid valve 85 is opened so that water flows through line 50, check valve 52, pump 48, coil 54, three way valve 80, line 82, and check valve 84 to air coil 30. Water returns to tank 12 via line 75, open solenoid valve 85 and line 87.

It will be clear from the foregoing description that the system, readily lends itself to automatic control. For example, not only can the operation of the subsystems be controlled; but automatic changeover may be accomplished by presently known controls technology.

While this invention has been described in connection with a certain specific embodiment thereof, it is to be understood that this is by way of illustration and not by way of limitation; and the scope of the appended claims should be construed as broadly as the prior art will permit.

We claim:

1. A combination heating and cooling system comprising: a solar collector producing a heated fluid; an absorption machine having a generator, a condenser, an absorber, and an evaporator all connected in a closed circuit, continuous cycle absorption system, said evaporator being adapted to cool a fluid to be circulated to a load; a compression cycle system including a condenser and an evaporator through which a refrigerant is circulated; and means for circulating said heated fluid from said solar collector in series flow through said compression cycle system condenser and said generator.

2. A system as defined in claim 1 including heated fluid storage means receiving heated fluid from said solar collector; an auxiliary evaporator in said storage means; means for selectively directing said refrigerant to said auxiliary evaporator; and means for bypassing said absorption machine and passing the fluid circulated to said load in heat exchange relation with said compression cycle system condenser.

3. A system as defined in claim 1 including means for bypassing said abosrption machine evaporator and circulating said heated fluid from said solar collector to said load.

* * * * *

UNITED STATES PATENT OFFICE
CERTIFICATE OF CORRECTION

PATENT NO. : 4,070,870
DATED : January 31, 1978
INVENTOR(S) : Vijay D. Bahel and Richard L. Kuehner It is certified that error appears in the above-identified patent and that said Letters Patent are hereby corrected as shown below:

Column 4, line 62, cancel "abosrption" and insert -- absorption --.

Signed and Sealed this

Sixteenth Day of May 1978

[SEAL]

Attest:

RUTH C. MASON
Attesting Officer

LUTRELLE F. PARKER
Acting Commissioner of Patents and Trademarks